June 8, 1965     J. A. POPE     3,187,643
PISTONS FOR INTERNAL COMBUSTION ENGINES
Filed Sept. 24, 1963
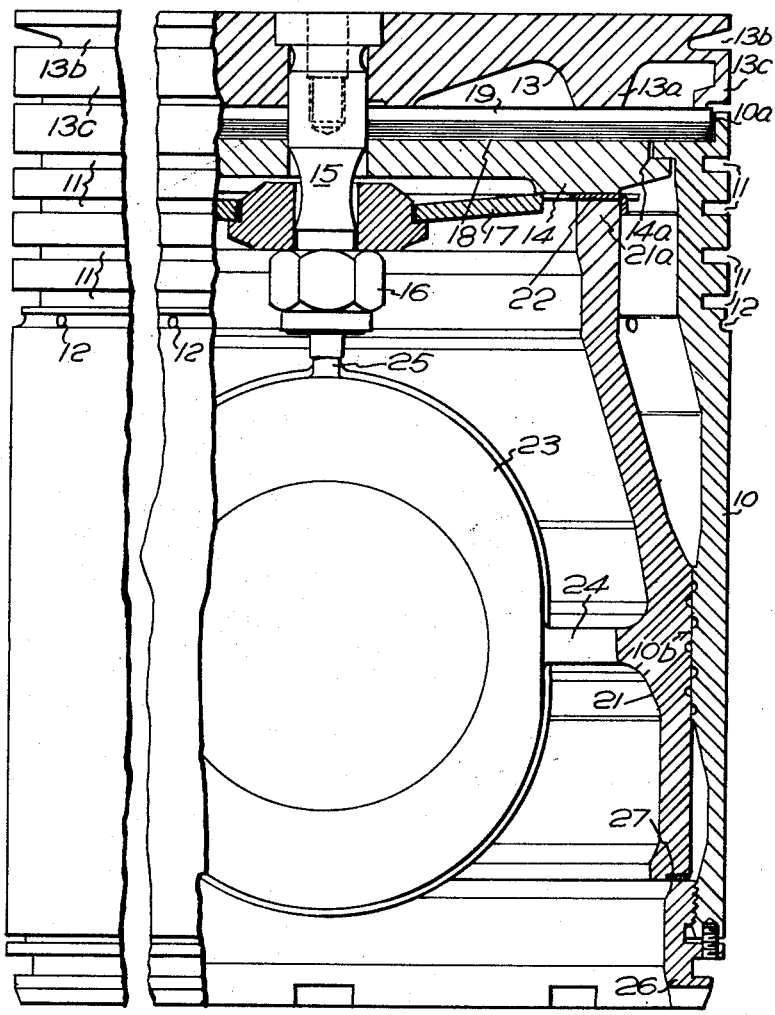
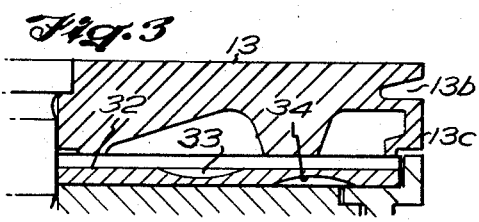
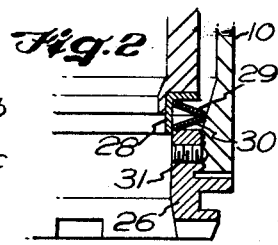
INVENTOR.
Joseph A. Pope
BY Bierman + Bierman

3,187,643
PISTONS FOR INTERNAL COMBUSTION ENGINES
Joseph A. Pope, Bramhall, England, assignor to Mirrlees National Limited, a company of Great Britain, Northern Ireland and Isle of Man
Filed Sept. 24, 1963, Ser. No. 311,156
21 Claims. (Cl. 92—176)

This invention relates to piston for internal combustion engines, and is particularly, though not exclusively, applicable to large pistons, that is to say of the order of 200 mms. diameter and over, such as are used in diesel engines.

There are several known problems in the construction of pistons for internal combustion engines one of which is to avoid distortion of the cylindrical wall of the piston resulting mainly from stresses generated by the combustion pressure and temperature on the crown of the piston, and another of which is the incidence of metal fatigue and failure at an angle of junction of the crown and skirt.

Still another problem lies in the transmission of stresses at the gudgeon pin both in transmitting the piston thrust thereto and in enabling the lateral component of such thrust to be taken by the piston skirt with a minimum of distortion of the piston skirt.

One object of the present invention is to provide an improved construction of piston which will relieve the piston at the angle of the crown and skirt of a substantial proportion of stresses due to flexing, or temperature-generated dimensional changes, of the crown.

Another object of the present invention is to enable the thrust of combustion acting on the piston crown to be transmitted to the gudgeon pin substantially without stressing the skirt of the piston in the direction of such thrust and to enable the lateral reaction component from the angularity of the connecting rod to be transmitted through the gudgeon pin to the skirt of the piston in a direction normal to the outer wall thereof.

According to the present invention a piston for an internal combustion engine having a crown and skirt is characterised in that the piston comprises an assembly of inner and outer crown members with means for securing them together, said crown members being integers separate from, but connected to, a piston skirt by complementary clamping surfaces so constructed and arranged as to provide a mechanical joint which simultaneously provides a gas seal and reduces the transmission to the skirt of stresses due to bending or dimensional changes in the crown assembly.

The piston aforesaid may be further characterised in that the outer crown member is formed on its under face with a defined annular pressure-transmitting zone set inwards from the peripheral edge and by inner and outer piston skirts, the former carrying a gudgeon pin and having an end thrust-receiving rim complementarily axially in line with such annular zone; and further characterised in that the inner and outer piston skirts formed with defined complementary annular cylindrical pressure-transmitting and receiving zones providing a pressure area on each side of a plane normal to the axis of the piston and in which the axis of the gudgeon pin lies within limits defined by further planes parallel to the first and tangential to the gudgeon pin.

In the accompanying drawing:

FIG. 1 is a longitudinal section of one example of a piston made in accordance with the present invention.

FIGS. 2 and 3 are fragmentary sectional views showing modifications of the piston shown in FIG. 1.

As shown in FIG. 1 of the drawing, the piston comprises a main skirt 10 having annular ring grooves 11 and an oil return groove 12 of normal form at its upper end. The piston crown is however not integral with the skirt 10 but consists of an outer crown disc 13 and an inner crown disc 14 secured together by means of a central bolt 15, nut 16 and disc spring 17. The outer crown disc 13 is shaped away on its underside to form an annular rib 13a set in a suitable distance from the edge of the disc to form a zone for the transmission of pressure to the inner crown disc 14. Between the two discs is a laminated heat barrier assembly 18 and a cover disc 19. The upper end of the skirt is formed with a rebate 10a having its axially directed face lying substantially in the same plane as the top surface of the inner crown disc 14 part of which rebate is provided by an annular inwardly extending rib 20 complementary to a rebate 14a in the peripheral edge of the inner disc 14. The peripheral face of the rebate 10a is of slightly greater internal diameter than the outer edge of the heat barrier and its cover disc 19 whilst there is also a cylindrical clearance between the rib 20 and the rebate 14a aforesaid. The skirt 10 is therefore constrained to move axially with the piston crown by reason of location of the rib 20 between the rebate 14a and the heat barrier assembly. At its outer peripheral edge, the outer crown disc is grooved at 13b and shaped so as to form a peripheral rim 13c the lower edge when not stressed extends slightly beyond the face of the rib 13a and is adapted to press on the cover disc 19 so as to be stressed to provide a gas seal, the shaping of the rim being designed to give some degree of resilience for that purpose.

Within the skirt 10 is an inner skirt having a lower cylindrical portion 21 and an upwardly extending portion terminating in a rim 21a concentric with the annular rib 13a. The inner crown disc 14 is adapted to be supported by such rim with a copper or like washer 22 interposed to provide thrust bedding. The inner skirt 21 is formed integral with gudgeon pin bosses 23 which are additionally stiffened by annular webs 24 on the axis of the bosses and by axial webs 25 connecting the bosses 23 with the skirts 21 and 21a.

On the inner wall of the skirt 10 is a cylindrical seating 10b complementary to the skirt 21 for receiving lateral thrust therefrom, the engaging surfaces having suitable oil-retaining grooves. The inner skirt 21 is secured within the skirt 10 by a nut 26 screwing into the lower end of the skirt 10 and itself secured by suitable locking means. A bedding ring 27 of copper or like soft material enables the rib 20 to be uniformly stressed against the rebate 14a so as to pre-load the rim 21a against the underside of the inner crown plate 14.

In use, the combustion pressure applied to the outer crown disc 13 is transmitted through the heat barrier assembly 19, 18, to the inner crown disc 14 by the annular rib 13a, and from the disc 14 through the bedding element 22 to the rim 21a of the inner skirt and thereby direct to the gudgeon pin lugs 23. As the trim 21a is concentric with the rib 13a and of the same diameter the line of thrust transmission is axial of the piston and such thrust is not imposed on the main skirt 10. The component of lateral thrust from the angularity of the connecting rod is transmitted to the skirt 10 through the annular inner surface 10b and the width and position of that surface is such that the axis of the gudgeon pin lugs lies in a plane substantially in the longitudinal axis of such area. By this means, the skirt 10 is only subjected to pressure normal to its outer surface and such pressure is transmitted thereto substantially radially of the gudgeon pin.

Any curvature of the crown due to pressure, or dimensional change thereof due to heat is not transmitted to the skirt and the vulnerable corner at the junction of the crown and skirt no longer presents a problem of cracking due to fatigue. Equally, the outer skirt does not have to transmit the axial loads, whilst the radial loads are transmitted to the skirt in line with the source of such radial forces.

As shown in FIG. 2, in place of the copper or like soft bedding ring 27 there is provided an annular ring 28 of angle section which is a carrier for a pair of conically formed spring rings 29, 30 while the locking means for the nut 26 is replaced by a grub-screw 31 arranged radially in the wall of the ring-like nut 26.

The aforesaid construction ensures that the inner piston skirt 21 maintains its pre-load, or a major portion of it in spite of differential thermal expansion between the inner piston 21 and the skirt 10.

In the modification shown in FIG. 3 instead of the laminated heat-barrier assembly shown in FIG. 1 there is provided a steel disc 32 the faces of which are machined, as shown at 33 and 34 to provide heat-insulating air pockets the function of which requires no explanation.

I claim:

1. A piston for an internal combustion engine having a crown and skirt, characterized in that the piston comprises an assembly of inner and outer crown members being integers separate from but connected to the piston skirt by complementary clamping surfaces so constructed and arranged as to provide a mechanical joint which simultaneously provides a gas seal and reduces the transmission to the skirt of stresses due to bending or dimensional changes in the crown assembly and further characterized in that the outer crown member is formed on its under face with a defined annular pressure-transmitting zone set inwards from the peripheral edge and by inner and outer piston skirts, the former carrying a gudgeon pin and having an end thrust-receiving rim complementarily axially in line with such annular zone.

2. A piston according to claim 1 further characterised in that the inner and outer piston skirts formed with defined complementary annular cylindrical pressure-transmitting and receiving zones providing a pressure area on each side of a plane normal to the axis of the piston and in which the axis of the gudgeon pin lies within limits defined by further planes parallel to the first and tangential to the gudgeon pin.

3. A piston for an internal combustion engine comprising an outer skirt with inwardly projecting flange at the crown end; a crown assembly comprising inner and outer crown members, a heat barrier member located between them and resting on said flange, said inner crown member having a flange engaging the inner face of said inwardly projecting flange and means for clamping together the parts of such assembly to grip the inwardly projecting flange of the outer skirt; an inner skirt, gudgeon pin bearings in said inner skirt, thrust-transmitting formations on said inner skirt and said outer crown member in relative axial alignment, and complementary contacting annular inner and outer surfaces on the outer and inner skirts in the annular planar zone of the gudgeon pin bearings for lateral thrust transmission, and means at the open end of the piston for securing the inner skirt within the outer skirt to preload and hold it against the inner crown.

4. A piston according to claim 3 characterised by resilient means associated with the means for securing the inner skirt within the outer skirt so as axially to preload by loading the said resilient means.

5. A piston according to claim 3 characterised in that the heat-insulating barrier member comprises a laminated assembly.

6. A piston according to claim 3 characterised in that the heat-insulating barrier member comprises a solid plate formed with recesses to provide air pockets.

7. A piston for an internal combustion engine having separately constructed crown and skirt portions characterized by inner and outer crown members, clamping means between such crown members for holding them together, inner and outer skirts separate from said crown members, gudgeon pin lugs on the inner skirt, complementary engaging radial thrust transmitting formations on the inner and outer skirts, axially engageable crown clamping formations at the crown ends of the skirts which are engageable with the inner crown and means for axially loading the inner skirt thereby against the inner crown.

8. A piston for an internal combustion engine having separately constructed crown and skirt portions characterized by inner, and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown and a heat barrier member located between the inner and outer crown members, said barrier being in the form of at least one insulating disk extending across the area of said crown members.

9. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown and means for axially loading the inner skirt thereby against the inner crown, the outer crown member being formed on its under face with a defined annular pressure-transmitting zone axially in line with an annular end of the inner skirt.

10. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown, and the outer crown members, the outer crown member being formed on its under face with a defined annular pressure-transmitting zone axially in line with an annular end of the inner skirt.

11. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown and means for axially loading the inner skirt thereby against the inner crown, the outer crown member being formed on its under face with a defined annular pressure-transmitting zone axially in line with an annular end of the inner skirt, the said complementary engaging radial thrust transmitting formations on the inner and outer skirts providing a thrust transmitting area on each side of a plane normal to the axis of the piston and in which the axis of the gudgeon pin lies.

12. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown and means for axially loading the inner skirt thereby against the inner crown, the clamping means between the crown members including a resilient member.

13. A piston for an internal combustion engine having separately constructed crown and skirt portions characterized by inner, and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown and a heat barrier member located between the inner and outer crown members; the said complementary engaging radial thrust transmitting formations on the inner and outer skirts providing a thrust transmitting area on each side of a plane normal to the axis of the piston and in which the axis of the gudgeon pin lies; and the said clamping means between the crown members including a resilient member.

14. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown and a heat barrier member located between the inner and outer crown members; the said complementary engaging radial thrust transmitting formations on the inner and outer skirts providing a thrust transmitting area on each side of a plane normal to the axis of the piston and in which the axis of the gudgeon pin lies; the said clamping means between the crown members including a resilient member, and the heat barrier member including a laminated assembly.

15. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown, and a heat barrier member including a laminated assembly, located between the inner and outer crown members.

16. A piston for an internal combustion engine having separately constructed crown and skirt portions characterized by inner and outer crown members, clamping means between such crown members for holding them together, inner and outer skirts, gudgeon pin lugs on the inner skirt, complementary engaging radial thrust transmitting formations on the inner and outer skirts, axially engageable crown clamping formations at the crown ends of the skirts engageable with the inner crown, means for axially loading the inner skirt thereby against the inner crown, and a heat barrier member comprising a solid plate, formed with recesses to provide air pockets, located between the inner and outer crown members.

17. A piston for an internal combustion engine the improvement which comprises inner and outer crown members, a heat barrier therebetween, a skirt separate from said members, the inner member being in contact with said skirt, said members being secured together, said barrier being in the form of at least one insulating disk extending across the area of said crown members.

18. A piston according to claim 17, an annular rib on the inner side of said outer member directly above the end of said skirt.

19. A piston for an internal combustion engine the improvement which comprises inner and outer skirts joined together at their lower ends, the upper part of said inner skirt tapering inwardly and the upper end in supporting engagement with the crown of said piston.

20. A piston according to claim 19, gudgeon pins within said inner skirt, radial and axial webs integral with said pins and inner skirt.

21. A piston according to claim 19, characterized in that said outer skirt is constrained to move axially.

References Cited by the Examiner
UNITED STATES PATENTS

| | | | |
|---|---|---|---|
| 1,245,641 | 11/17 | Ver Planck | 92—176 |
| 1,329,822 | 2/20 | Parkhurst | 92—214 |
| 1,518,986 | 12/24 | Kruse | 92—214 |
| 1,603,611 | 10/26 | Kottusch | 92—221 |
| 2,059,713 | 11/36 | Schneider | 92—176 |
| 2,064,371 | 12/36 | Burn | 92—214 |

KARL J. ALBRECHT, *Primary Examiner.*

RICHARD B. WILKINSON, *Examiner.*